(12) United States Patent
Roh et al.

(10) Patent No.: US 10,379,275 B2
(45) Date of Patent: *Aug. 13, 2019

(54) OPTICAL FILTER INCLUDING PLATES FOR FILTERING LIGHT AND OPTICAL MEASURING DEVICE EMPLOYING OPTICAL FILTER

(71) Applicant: SAMSUNG ELECTRONICS CO., LTD., Suwon-si (KR)

(72) Inventors: Younggeun Roh, Suwon-si (KR); Yeonsang Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/235,627

(22) Filed: Dec. 28, 2018

(65) Prior Publication Data

US 2019/0137672 A1 May 9, 2019

Related U.S. Application Data

(63) Continuation of application No. 14/790,763, filed on Jul. 2, 2015, now Pat. No. 10,203,438.

(30) Foreign Application Priority Data

Jul. 17, 2014 (KR) .................... 10-2014-0090354

(51) Int. Cl.
*G02B 5/28* (2006.01)
*G01J 1/04* (2006.01)
(Continued)

(52) U.S. Cl.
CPC .............. *G02B 5/28* (2013.01); *G01J 1/0488* (2013.01); *G01J 3/12* (2013.01); *G02B 5/284* (2013.01);
(Continued)

(58) Field of Classification Search
CPC ............ G01J 1/0488; G01J 2003/1204; G01J 2003/1226; G01J 2003/1213; G02B 5/1866; G02B 5/28
See application file for complete search history.

(56) References Cited

U.S. PATENT DOCUMENTS 4,675,727 A 6/1987 Sekizawa et al.
4,822,998 A * 4/1989 Yokota ...................... G01J 3/26
250/226

(Continued)

FOREIGN PATENT DOCUMENTS

KR 10-0965364 B1 6/2010
KR 10-2014-0019157 A 2/2014

*Primary Examiner* — Michael P LaPage
(74) *Attorney, Agent, or Firm* — Sughrue Mion, PLLC

(57) ABSTRACT

An optical filter includes pixels, each including: a first reflective plate configured to receive light and having first holes; and a second reflective plate facing the first reflective plate, separated from the first reflective plate by a gap, and having second holes corresponding to the first holes in shape and orientation. The second reflective plate is configured to transmit the light of a wavelength or the light of a range of wavelengths transmitted through the first reflective plate and incident on the second reflective plate, according to a spacing between adjacent holes of the first holes or a spacing between adjacent holes of the second holes. At least one pixel has the spacing between adjacent holes of the first holes different from that of at least one another pixel, or has the spacing between adjacent holes of the second holes different from that of the at least one another pixel.

22 Claims, 7 Drawing Sheets

(51) Int. Cl.
 *G01J 3/12* (2006.01)
 *G02B 5/18* (2006.01)
(52) U.S. Cl.
 CPC ..... *G01J 2003/1213* (2013.01); *G02B 5/1866* (2013.01)

(56) References Cited

U.S. PATENT DOCUMENTS

| | | |
|---|---|---|
| 5,519,205 A | 5/1996 | Rostoker |
| 5,550,373 A | 8/1996 | Cole et al. |
| 6,016,199 A * | 1/2000 | Newton ............ G01J 3/26 356/454 |
| 8,666,201 B2 | 3/2014 | Grepstad et al. |
| 2006/0209413 A1 | 9/2006 | Kim et al. |
| 2008/0158550 A1 | 7/2008 | Arieli et al. |
| 2008/0174777 A1 | 7/2008 | Carron |
| 2009/0116029 A1 | 5/2009 | Ohtera et al. |
| 2010/0053755 A1 | 3/2010 | Lee et al. |
| 2011/0266445 A1 | 11/2011 | Beratan |
| 2011/0290982 A1 | 12/2011 | Boutami et al. |
| 2012/0236313 A1 | 9/2012 | Nakamura |
| 2013/0120843 A1 | 5/2013 | Junger et al. |
| 2015/0253525 A1 | 9/2015 | Hong et al. |

* cited by examiner

OPTICAL FILTER INCLUDING PLATES FOR FILTERING LIGHT AND OPTICAL MEASURING DEVICE EMPLOYING OPTICAL FILTER

CROSS-REFERENCE TO RELATED APPLICATIONS

This is a continuation of U.S. application Ser. No. 14/790,763 filed Jul. 2, 2015, which claims priority from Korean Patent Application No. 10-2014-0090354, filed on Jul. 17, 2014 in the Korean Intellectual Property Office. The disclosures of the above-named applications are incorporated herein in their entireties by reference.

BACKGROUND

1. Field

Apparatuses and methods consistent with exemplary embodiments relate to optical filters and optical measuring devices employing the same, and more particularly, to optical filters designed to have a narrow linewidth of light and change a wavelength being filtered during a manufacturing process and optical measuring devices employing the optical filters, which are capable of measuring intensity of light filtered for each pixel.

2. Description of the Related Art

In general, optical spectrum analysis is used to measure and analyze physical and chemical states of an object. This analysis technique is used in various industrial fields such as optics, medicine, chemistry, and ocean engineering.

In optical spectrum analysis, optical spectroscopy is used to split light into several wavelength ranges and measure intensity of the light at each wavelength to analyze the spectrum of the light. The optical spectroscopy is classified into a light scattering technique in which incident light is transmitted through a periodic crystal structure and scattered in different directions at each wavelength and a filtering technique in which only light of a specific wavelength is transmitted through an optical filter.

In the light scattering technique, an optical sensor may be fixed, and a crystal structure may rotate so as to measure light of different wavelengths that reach the optical sensor. Alternatively, a crystal structure may be fixed, and a plurality of optical sensors may be located at different positions so that each optical sensor measures light of a particular wavelength.

In the filtering technique, an optical filter may be a metal mesh filter, a dichroic filter using a thin film, a filter using a Fabry-Perot interferometer, or a pigment type color filter manufactured by coating a substrate with a pigment-dispersed photoresist solution and patterning the substrate.

In recent years, optical spectrum analysis has been used extensively in a variety of applications, beyond laboratory analysis, including everyday-life items such as portable and wearable devices. Thus, there is an increasing need for a small-volume optical filter to filter a very narrow linewidth wavelength region. Furthermore, as optical filters have been used in a wide variety of applications, a technique of easily changing a wavelength being filtered by an optical filter during a manufacturing process has become an economically important issue. Furthermore, much attention is being directed toward miniaturization of a device for measuring an optical spectrum by using an optical filter.

SUMMARY

Exemplary embodiments provide optical filters to filter a narrow linewidth wavelength and change a wavelength being filtered by an optical filter during a manufacturing process and optical measuring devices employing the optical filters.

According to an aspect of an exemplary embodiment, there is provided an optical filter including at least one pixel, wherein the at least one pixel may include: a first reflective plate that is configured to receive the incident light have a plurality of first holes formed therein; and a second reflective plate that is configured to transmit particular wavelength or range of wavelengths of the light transmitted through the first reflective plate, faces the first reflective plate with a gap between the first reflective plate and the second reflective plate, and has a plurality of second holes formed therein.

The wavelength or range of wavelengths of light transmitted through the second reflective plate may correspond to a thickness of the first and second reflective plates.

The wavelength or range of wavelengths of light transmitted through the second reflective plate may correspond to a refractive index of a material of the first and second reflective plates.

The wavelength or range of wavelengths of light transmitted through the second reflective plate may correspond to a distance between the first and second reflective plates.

The wavelength or range of wavelengths of light transmitted through the second reflective plate may correspond to sizes of the first and second holes.

The wavelength or range of wavelengths of light transmitted through the second reflective plate may correspond to a spacing between adjacent ones of the first holes or a spacing between adjacent ones of the second holes.

The first and second holes may be arranged in regular patterns.

The first holes and the second holes may have a same shape and arrangement pattern.

The first holes may be vertically aligned to overlap with the second holes.

The first and second holes may have a slit shape or circular shape.

The optical filter may include a plurality of pixels including the at least one pixel, and wherein at least two of the pixels transmit light of different wavelengths.

The optical filter may further include a lens configured to change a path of the light incident on the first reflective plate.

Each of the first and second reflective plate may include a material having a refractive index greater than 3.

Each of the first and second reflective plates may include at least one selected from a group consisting of gallium phosphide (GaP), mercury sulfide (HgS), gallium arsenide (GaAs), germanium (Ge), silicon (Si), silicon dioxide ($SiO_2$), silicon nitride (SiN), indium phosphide (InP), and any combinations thereof.

According to an aspect of another exemplary embodiment, there is provided an optical measuring device including: an optical filter including at least one first pixel; and a sensor that is configured to measure an intensity of light transmitted through the optical filter and includes at least one second pixel corresponding to the at least one first pixel, wherein the at least one first pixel includes: a first reflective plate configured to receive the incident light and has a plurality of first holes formed therein; and a second reflective plate configured to transmit particular wavelength or range of wavelengths of the light transmitted through the first reflective plate, faces the first reflective plate with a gap between the first reflective plate and the second reflective plate, and has a plurality of second holes formed therein.

The wavelength or range of wavelengths of light transmitted through the second reflective plate may correspond to at least one selected from a thickness of the first and second reflective plates, a refractive index of a material of the first and second reflective plates, a distance between the first and second reflective plates, sizes of the first and second holes, a spacing between adjacent ones of the first holes, and a spacing between adjacent ones of the second holes.

The first and second holes may be arranged in regular patterns.

The first holes and the second holes may have a same shape and arrangement pattern.

The first and second holes may have a slit shape or circular shape.

The optical filter may further include a lens configured to change a path of the light incident on the first reflective plate.

Each of the first and second reflective plates may include a material having a refractive index greater than 3.

Each of the first and second reflective plates may include at least one selected from a group consisting of gallium phosphide (GaP), mercury sulfide (HgS), gallium arsenide (GaAs), germanium (Ge), silicon (Si), silicon dioxide ($SiO_2$), silicon nitride (SiN), indium phosphide (InP), and any combinations thereof.

The at least one second pixel may include an optical sensor configured to measure an intensity of light transmitted through the at least one first pixel.

The optical measuring device may further include a correction processor configured to receive the intensity of light measured in the at least one second pixel and correct the measured intensity of light in consideration of transmittance of light transmitted through the at least one first pixel.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION

Figure 1:
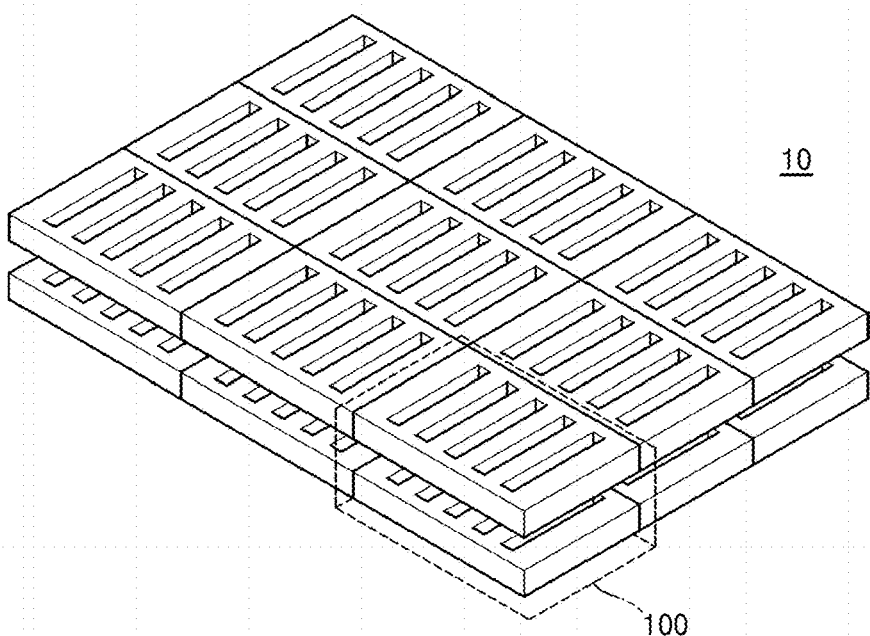
FIG. 1 is a perspective view of an optical filter according to an exemplary embodiment.

Exemplary embodiments are described in greater detail below with reference to the accompanying drawings.

In the following description, like drawing reference numerals are used for like elements, even in different drawings. Sizes or thicknesses of elements may be exaggerated for clarity. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail. Expressions such as "at least one of," when preceding a list of elements, modify the entire list of elements and do not modify the individual elements of the list.

FIG. 1 is a perspective view of an optical filter 10 according to an exemplary embodiment. The optical filter 10 according to the present embodiment may be an optical device that selectively transmits only a particular wavelength of incident light. The particular wavelength may be set differently depending on the type of an optical device in which the optical filter 10 is disposed. For example, the optical filter 10 may be an optical device for selectively transmitting light of different wavelengths in the visible light, infrared light, and ultraviolet light spectrum. However, this may be only an example, and exemplary embodiments are not limited thereto.

As shown in FIG. 1, the optical filter 10 may include a plurality of pixels including a pixel 100 or may include only the pixel 100. Accordingly, the pixel 100 may refer to all or a part of the optical filter 10 and may be the smallest unit region of the optical filter 10 for filtering a specific wavelength or range of wavelengths of light. Thus, if the optical filter 10 includes only the pixel 100, the entire optical filter 10 may be considered to be the pixel 100. On the other hand, if the optical filter 10 includes the plurality of pixels for filtering different wavelengths or ranges of wavelengths, each of the plurality of pixels, including the pixel 100, may filter its corresponding wavelength or range of wavelengths among the different wavelengths or ranges of wavelengths.

While FIG. 1 shows that the plurality of pixels in the optical filter 10 are divided into rectangular parallelepipeds, exemplary embodiments are not limited thereto. The pixel 100 may have any three-dimensional (3D) or two-dimensional (2D) shape according to the appearance or shape of the optical filter 10. Furthermore, although FIG. 1 shows that the plurality of pixels in the optical filter 10 have the same size, exemplary embodiments are not limited thereto, and the plurality of pixels may have different volumes or sizes if necessary. At least two of the plurality of pixels may selectively transmit light of different wavelengths. In other words, the plurality of pixels may filter different wavelengths or ranges of wavelengths of light. However, exemplary embodiments are not limited thereto, and if necessary, any two of the plurality of pixels may filter the same wavelength or range of wavelengths.

Figure 2:
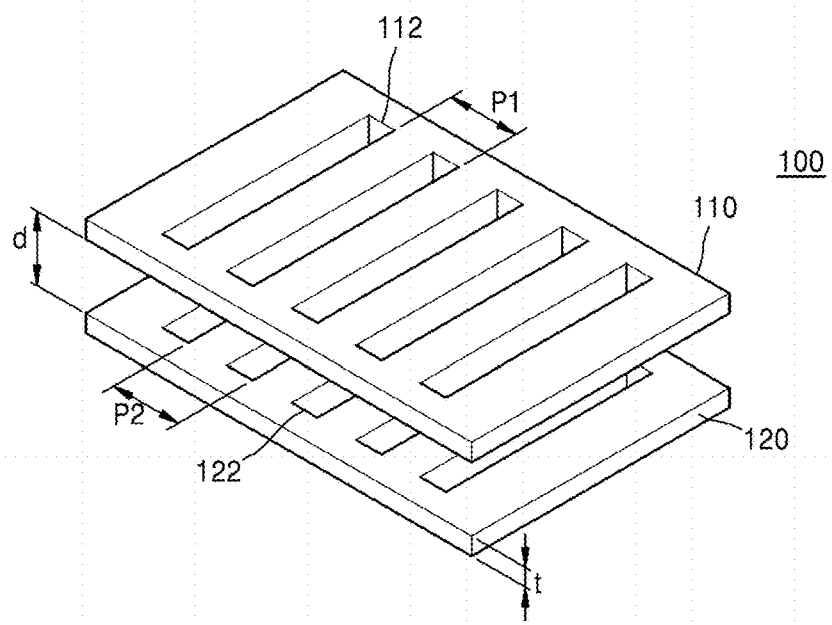
FIG. 2 is an enlarged view of a pixel of FIG. 1.

FIG. 2 is an enlarged view of the pixel 100 of FIG. 1.

As shown in FIG. 2, the pixel 100 includes first and second reflective plates 110 and 120 that are separated from and oppose each other. The first reflective plate 110 on which light is incident includes a plurality of first holes 112. The second reflective plate 120 is adapted to receive light transmitted through the first reflective plate 110 and includes a plurality of second holes 122. The plurality of the pixels in the optical filter 10 of FIG. 1 may include the first and second reflective plates 110 and 120 as shown in FIG. 2, but is not limited thereto. For example, some of the plurality of pixels in the optical filter 10 of FIG. 1 may not include the first and second reflective plates 110 and 120. However, at least one of the plurality of pixels, for example the pixel 100, includes the first and second reflective plates 110 and 120.

The first and second reflective plates 110 and 120 may have any panel shape that reflects some of the incident light and transmits the remainder thereof. To selectively transmit some of the incident light, the first and second reflective plates 110 and 120 may include a component having a refractive index different from that of an external medium that is in contact with the first and second reflective plates 110 and 120. Thus, when light incident from the external medium reaches the first and second reflective plates 110 and 120, some of the incident light may be reflected, and the rest of the light may be transmitted. As described above, each of the first and second reflective plates 110 and 120 may have a panel shape. The panel shape may refer to a shape having a flat or curved surface and a thickness that is consistent or little change when measured from the surface of the first and second reflective plates 110 and 120. While FIG. 2 shows that the first and second reflective plates 110 and 120 are rectangular in shape, exemplary embodiments are not limited thereto. For example, the first and second reflective plates 110 and 120 may have a circular, polygonal, or any other shape.

As described above, the first and second reflective plates 110 and 120 oppose each other and are separated from each other by a distance d as shown in FIG. 2. The distance d may be uniform, but may vary from one pixel 100 to another. "Opposing each other" may mean that first and second reflective plates 110 and 120 face each other as shown in FIG. 1. In other words, one of the first and second reflective plates 110 and 120 may be parallel to the other or face the other with being slightly oblique thereto.

The plurality of first holes 112 and the plurality of second holes 122 are formed in the first and second reflective plates 110 and 120, respectively. In this case, the first and second "holes" 112 and 122 may be regions penetrating the first and second reflective plates 110 and 120, respectively. The first and second holes 112 and 122 may have the same or different shapes. The first and second holes 112 and 122 may also have refractive indices close to or equal to that of an external medium. Due to formation of the first and second holes 112 and 122, the first and second reflective plates 110 and 120 may each have a high reflectance of light. In detail, reflectance on the surfaces of the first and second reflective plates 110 and 120 is higher than that on other reflective plates without the first and second holes 112 and 122, due to interference between light transmitted through the remaining regions of the first and second reflective plates 110 and 120 other than the first and second holes 112 and 122 and light transmitted through the first and second holes 112 and 122 as well as interference of light within the first and second holes 112 and 122.

Due to the increase in reflectances of the first and second reflective plates 110 and 120, a linewidth of light of the optical filter may be decreased. A linewidth of light may be a factor representing a range of wavelengths of light being transmitted. Thus, as a linewidth of light decreases, only light of a narrow range of wavelengths may be transmitted. The linewidth of light may be determined according to various schemes. For example, the linewidth of light may be determined by a difference between a wavelength at a peak of intensity in a graph of intensity against wavelength being passed through the optical filter and a wavelength corresponding to half the peak of intensity. This is an example only, and a linewidth of light may be determined according to other various methods. A quality (Q) factor is a variable related to a linewidth of light of the optical filter and may be defined by Equation (1) below:

$$Q = \frac{\lambda_c}{\Delta\lambda} \qquad (1)$$

where $\Delta\lambda$ is a bandwidth in a graph of intensity of light against wavelength being passed, and $\lambda_c$ wavelength at the peak intensity.

Since a bandwidth (or linewidth) $\Delta\lambda$ is decreased, a Q factor is increased Thus, as the Q factor increases, a linewidth of light of the optical filter 10 will decrease. The Q factor may be defined by Equation (2) below:

$$Q \propto \frac{(r_1 r_2)^{1/4}}{1 - (r_1 r_2)^{1/2}} \qquad (2)$$

where $r_1$ is a reflectance of the first reflective plate 110 and $r_2$ is a reflectance of the second reflective plate 120.

As defined in Equation (2) above, with the increase in reflectances of the first and second reflective plates 110 and 120, the Q factor increases, and thus a linewidth of light of the pixel 100 decreases. Thus, when the reflectances of the first and second reflective plates 110 and 120 are increased due to formation of the first and second holes 112 and 122 in the first and second reflective plates 110 and 120, respectively, a linewidth of light of the pixel 100 in the optical filter 10 may be decreased.

Figure 3:
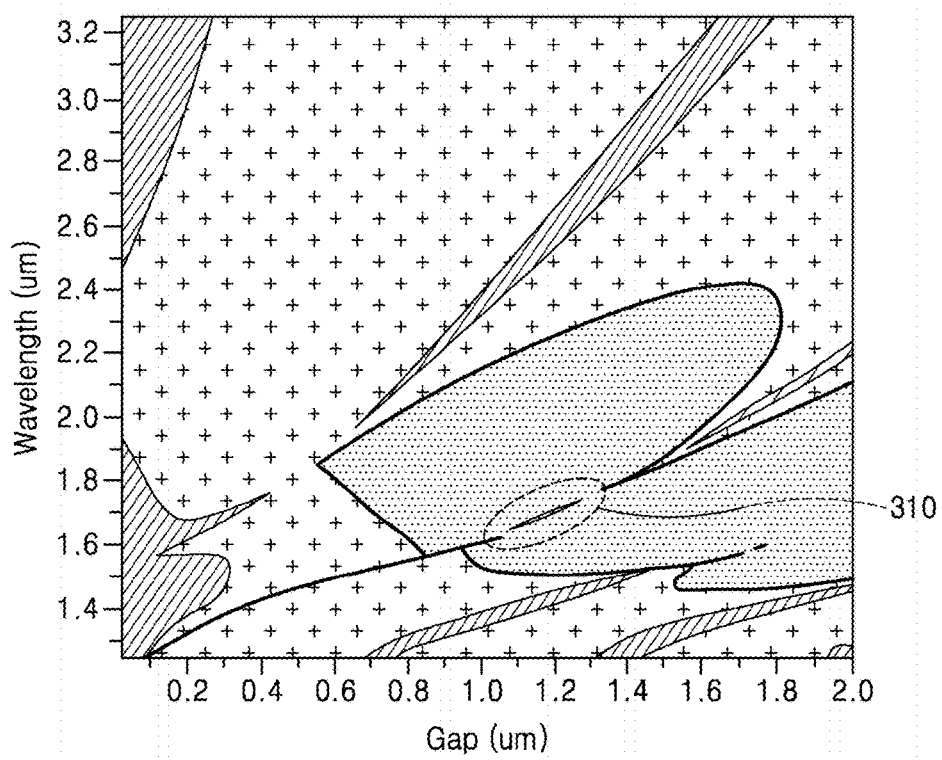
FIG. 3 illustrates a simulation result of transmittance with respect to a wavelength of light passing through a pixel in the optical filter of FIG. 1.

FIG. 3 illustrates a simulation result of transmittance with respect to a wavelength of light passing through the pixel 100 in the optical filter 10 of FIG. 1.

The simulation result of FIG. 3 is based on a simulation performed using Rigorous Coupled Wave Analysis (RCWA). In FIG. 3, the ordinate and abscissa represent a wavelength of incident light and a gap between the first and second reflective plates 110 and 120, respectively. Furthermore, a region indicated by '+' represents a region having a reflectance that is higher than a transmittance of light at the region, and a region indicated by dots '.' represents a high reflection region where a negative value of return loss due to reflection is greater than or equal to 20 dB. A region indicated by oblique lines represents a region of relatively high transmittance compared to other regions In FIG. 3, interesting region is a region which is denoted as 310. The region 310 may include a very narrow region of relatively high transmittance among a high reflectance region. The presence of the very narrow region in the region 310 means that transmittance and reflectance of light vary very sensitively to a change in wavelength in the region 310 when a gap between the first and second reflective plates 110 and 120 is determined. In other words, a linewidth of light of the region 310 is very narrow because in the region 310, a transmittance of light is rapidly changed even when there is a little change in a wavelength.

In FIG. 3, the simulation was performed when the first and second reflective plates 110 and 120 are formed of silicon (Si). However, the first and second reflective plates 110 and 120 may be made of other various materials. In order to increase reflectance of light on the first and second reflective plates 110 and 120 as described above, the first and second reflective plates 110 and 120 may contain a material having a refractive index higher than 3, but are not limited thereto. For example, each of the first and second reflective plates 110 and 120 may include gallium phosphide (GaP), mercury sulfide (HgS), gallium arsenide (GaAs), germanium (Ge), Si, silicon dioxide ($SiO_2$), silicon nitride (SiN), indium phosphide (InP), or any combination thereof, but is not limited thereto.

A wavelength of light transmitted through the second reflective plate 120 may be determined according to various variables. The wavelength of light transmitted through the second reflective plate 120 may be determined by at least one selected from a thickness t of the first and second reflective plates 110 and 120, a refractive index of a material of the first and second reflective plates 110 and 120, a distance d between the first and second reflective plates 110 and 120, sizes of the first and second holes 112 and 122, a spacing P1 between adjacent ones of the first holes 112, and a spacing P2 between adjacent ones of the second holes 122.

Among the above-described variables, the spacings P1 and P2 can be easily adjusted during a process of manufacturing the optical filter 10. Thus, by adjusting the spacings P1 and P2, it may be possible to easily change a wavelength to be filtered.

If the first and second holes 112 and 122 are not formed in the first and second reflective plates 110 and 120, respectively, a Febry-Perot interferometer model may be applied. In this case, a wavelength passing through the pixel 100 may be represented as a function of materials of the first and second reflective plates 110 and 120 and the distanced therebetween. For more precise calculation, other variables described above have also to be considered.

However, according to the present embodiment, by forming the first and second holes 112 and 122 in the first and second reflective plates 110 and 120, respectively, an effective value for the distance d substituted for applying a Febry-Perot model varies. In detail, when the first and second holes 112 and 122 are formed therein, a wavelength to be filtered is not determined based on a conventional Fabry-Perot model. Thus, to correct such an effect caused by the presence of the first and second holes 112 and 122 during application of the conventional Fabry-Perot model, the distance d needs to be corrected as an effective value. The effective value may be traced quantitatively based on various computer simulations or experimental results.

An effective value for the distance d may be determined by sizes and shapes of the first and second holes 112 and 113 and the spacings P1 and P2. Thus, by manipulating these variables, a wavelength being filtered may be easily changed.

Figure 4:
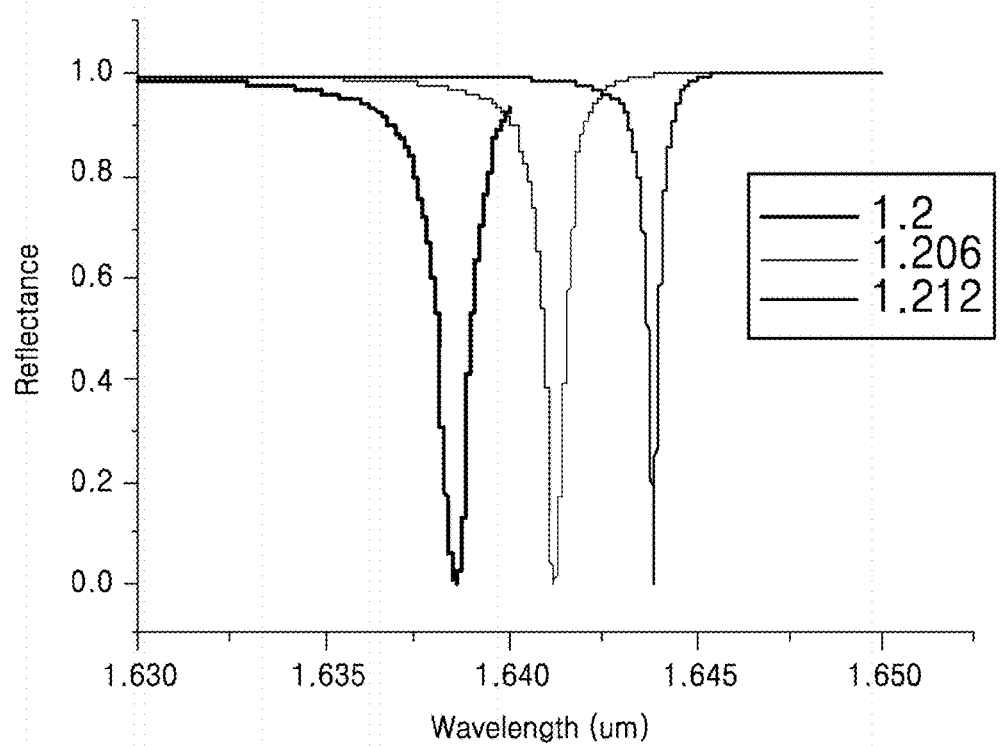
FIG. 4 illustrates a simulation result showing a change in a wavelength to be filtered according to a distance between holes in the optical filter of FIG. 1.

FIG. 4 illustrates a simulation result showing a change in a wavelength to be filtered according to spacings P1 and P2 between adjacent ones of the first holes 112 and between adjacent ones of the second holes 122 in the optical filter 10 of FIG. 1.

The simulation result of FIG. 4 is obtained from a simulation performed using RCWA. In the simulation, the first and second reflective plates 110 and 120 were made of Si, and a thickness t of the first and second reflective plates 110 and 120 was 265 nm, and a distance d between the first and second reflective plates 110 and 120 was 1.02 μm. To simplify calculations, the first and second holes 112 and 122 had the same shape as a slit and were arranged in the same repeating pattern. A filling factor, which is represented as a ratio (percentage) of an area of the first or second holes 112 or 122 to an area of a unit pattern, was set to 0.64 (64%). The unit pattern may mean the smallest unit of a repeating pattern in which the first and second holes 112 and 122 are arranged, as described in more detail below. Furthermore, the spacings P1 and P2 were set to the same spacing value P.

FIG. 4 illustrates a graph of reflectance against a wavelength of light incident on the pixel 100 of the optical filter 10 when the spacing value P of the spacings P1 and P2 are set to be 1.200 μm, 1.206 μm, and 1.212 μm, respectively. A region with reflectance close to 1 is a wavelength region where most light is reflected. A wavelength at the lowest point where reflectance is near 0 may be considered to be a representative value of a wavelength being transmitted through the pixel 100 of the optical filter 10. As apparent from FIG. 4, when the spacing value P increases by only 0.006 μm (0.5%), a wavelength at a bottom peak with the lowest reflectance value may be shifted to a larger value by approximately 3 to 4 nm. In other words, if the spacing value P increases or decreases by only about 1%, a representative value of a wavelength being transmitted through the pixel 100 may be shifted to a larger or smaller value by about 7 nm. Thus, by even slightly adjusting the spacings P1 and P2 during a manufacturing process, it is possible to easily change a wavelength being filtered.

Constructions of the optical filter 10 and the pixel 100 included in the optical filter 10, and effects thereof have been described above with reference to FIGS. 1 through 4. Formation of a plurality of first holes and a plurality of second holes in the first and second reflective plates 110 and 120, respectively, according to embodiments will now be described in greater detail.

Figure 5:
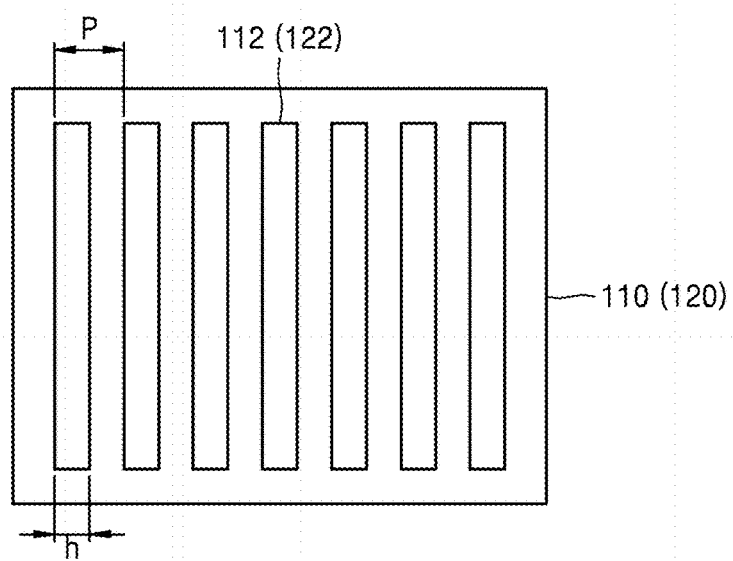
FIG. 5 is a plan view of a plurality of first (or second) holes formed in a first (or second) reflective plate in the optical filter of FIG. 1.

FIG. 5 is a plan view of a plurality of the first (or second) holes 112 (122) formed in the first (or second) reflective plate 110 (120) in the optical filter 10 of FIG. 1.

As shown in FIG. 5, the slit-shaped first holes 112 are linearly arranged in the first reflective plate 110. In this case, a wavelength of light being filtered may vary according to a change in a width h of each of the first holes 112 and a spacing P between adjacent ones of the first holes 112. While FIG. 5 shows that the first holes 112 have the same shape, they are not limited thereto. For example, each of the first holes 112 may have a slit shape with a variation or have a trapezoidal shape. The spacing value P may also not be uniform. The same description as presented with respect to FIG. 5 may also be applied to the second reflective plate 120.

Figure 6:
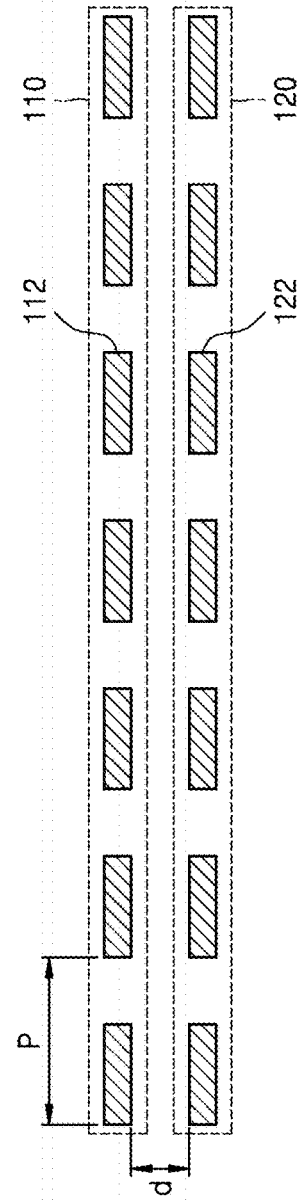
FIG. 6 illustrates a cross-section of a pixel including the first and second reflective plates in the optical filter of FIG. 1.

FIG. 6 illustrates a cross-section of the pixel 100 including the first and second reflective plates 110 and 120 in the optical filter of FIG. 1.

As shown in FIG. 6, the first and second holes 112 and 122 are formed in the first and second reflective plates 110 and 120, respectively. The first holes 112 are vertically aligned with the second hole 122. For example, each of the first holes 112 faces a corresponding one of the second holes 122, and they are not arranged in a staggered form. In the example, if a distance d between the first and second reflective plates 110 and 120 is decreased to 0, the first and second holes 112 and 122 may overlap each other substantially. In this case, the first and second holes 112 and 122 with the same shape may be arranged in the same pattern.

Figure 7:
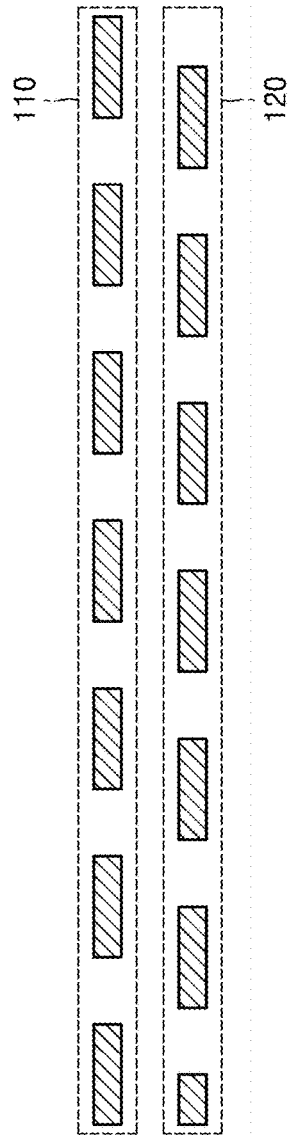
FIG. 7 illustrates a modified example of a cross-section of the pixel shown in FIG. 6.

FIG. 7 illustrates another example of a cross-section of the pixel 100 of FIG. 1.

As shown in FIG. 7, first and second holes 112 and 122 may be disposed in a staggered form rather than being aligned in a straight line. That is, if a distance d between the first and second reflective plates 110 and 120 is decreased to 0, the first and second holes 112 and 122 may not overlap each other completely.

Figure 8:
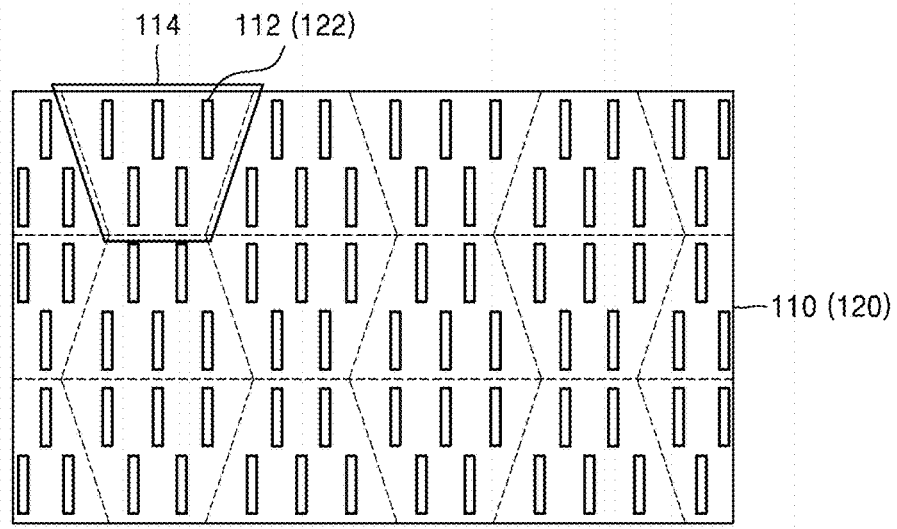
FIG. 8 illustrates a plurality of first (or second) holes formed in the first (or second) reflective plate in the optical filter of FIG. 1, according to another exemplary embodiment.

FIG. 8 illustrates a plurality of first (or second) holes 112 (122) formed in the first (or second) reflective plate 110 (120) in the optical filter 10 of FIG. 1, according to another exemplary embodiment.

As shown in FIG. 8, the plurality of first holes 112 are arranged in the first reflective plate 110 in a predetermined pattern. The predetermined pattern may be a pattern in which a plurality of sub-regions, including a sub-region 114, are repeatedly arranged in a two-dimensional (2D) way. Each of the plurality of sub-regions may include at least one first hole 112, and be the smallest unit of a repeating pattern in which the first holes are arranged. Each of the first and second reflective plates 110 and 120 may include the plurality of sub-regions. The plurality of sub-regions in the first reflective plate 110 may have the same shape as or a different shape from those in the second reflective plate 120. Furthermore, although a surface of the sub-region 114 has a trapezoidal shape, this is an example only, and the surface of the sub-region 114 may have a polygonal shape or other 2D shapes. The above descriptions with respect to FIG. 8 may be applied to both the first and second reflective plates 110 and 120.

Although it has been described that the first and second holes 112 and 122 are slit-shaped, exemplary embodiments are not limited thereto. The first and second holes 112 and 122 may have a polygonal shape, a circular shape, or other 2D shapes in a plan view.

Figure 9:
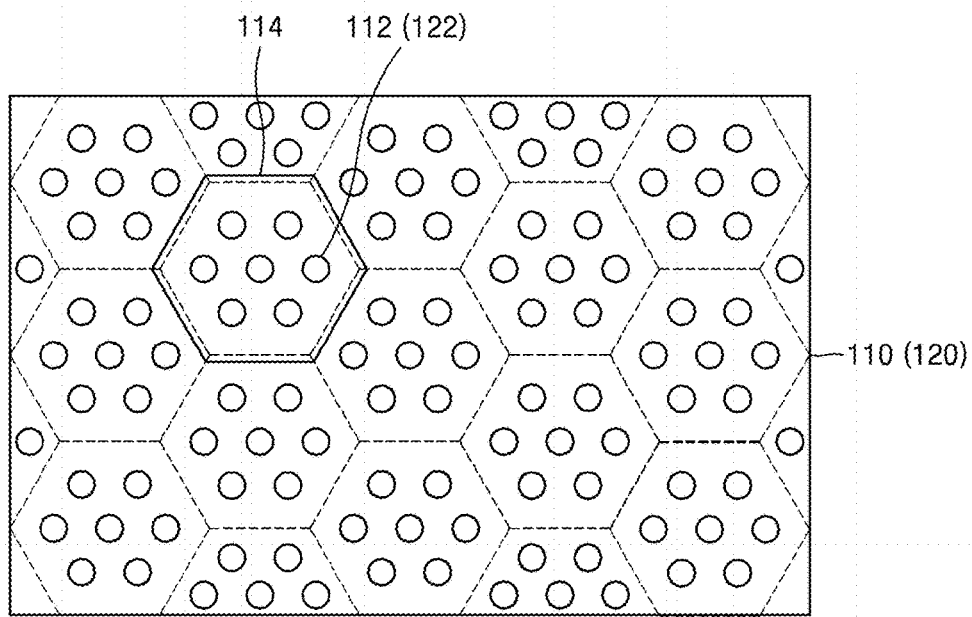
FIG. 9 illustrates a plurality of first (or second) holes formed in the first (or second) reflective plate in the optical filter of FIG. 1, according to another exemplary embodiment.

FIG. 9 illustrates a plurality of first (or second) holes, including a first (or a second) hole 112 (122), which are formed in the first (or second) reflective plate 110 (120) of the optical filter 10 of FIG. 1, according to another exemplary embodiment.

As shown in FIG. 9, each of the plurality of first holes may be circular. The plurality of first holes are grouped into regular hexagonal sub-regions, including a sub-region 114, and the regular hexagonal sub-regions may be arranged in a 2D repeating pattern. However, exemplary embodiments are not limited thereto, and the sub-region 114 or the first hole 112 may have a different shape than that described above. The same descriptions as presented above with respect to FIG. 9 may also be applied to the second reflective plate 120.

FIGS. 5, 8, and 9 illustrate shapes and arrangements of the first and second holes 112 and 122 according to various exemplary embodiments. As described above, the first and second holes 112 and 122 may have various shapes and sizes. When sizes of the first and second holes 122 change, a percentage of an area (or a filling factor) occupied by the first or second holes 112 or 122 within the sub-region 114 may vary. A wavelength of light being filtered may be changed by adjusting a filling factor. Thus, to change a wavelength of light being filtered during a process of manufacturing the optical filter 10, the size of the first or second holes 112 or 122 may be adjusted.

The optical filter 10 including at least one pixel 100 having the first and second reflective plates 110 and 120 has been described above in detail. Components of the optical filter 10 other than those described above will now be described in detail.

The pixel 100 of the optical filter 10 may selectively transmit light incident on the first reflective plate 110 according to a wavelength. In general, an angle at which light is incident on the first reflective plate 110 may not be uniform. Even when an incident angle is not uniform, the pixel 100 may perform a filtering function. However, if light is incident on the first reflective plate 110 at various angles, a wavelength region of the light being filtered may be different from an expected value. To prevent such an error and more uniformly maintain a filtering performance of the pixel 100, an angle at which light is incident on the first reflective plate 110 needs to be adjusted.

Figure 10:
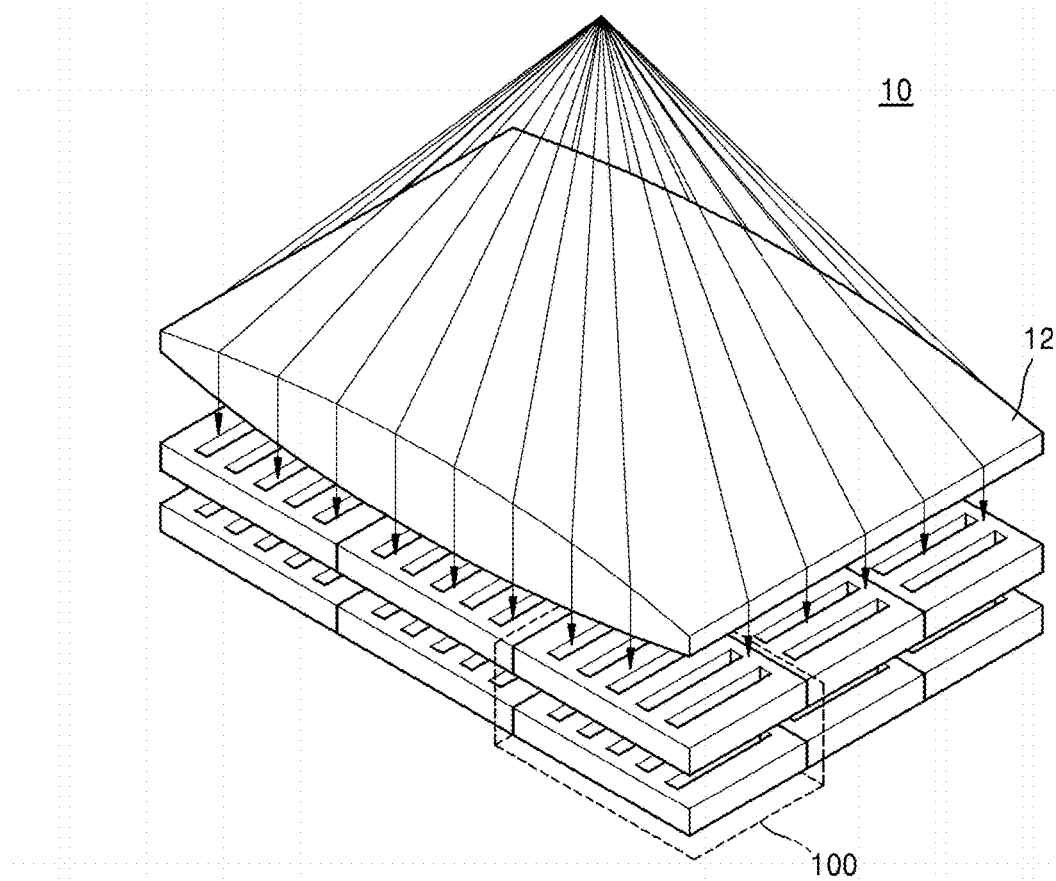
FIG. 10 is a perspective view of an optical filter according to another exemplary embodiment.

FIG. 10 is a perspective view of an optical filter 10 according to another exemplary embodiment.

As shown in FIG. 10, the optical filter 10 may further include a lens 12 that changes a path of light incident on a first reflective plate 110. The lens 12 may be a convex lens, a concave lens, or a combination thereof. The lens 12 may also change a path of light for all or only some of the pixels in the optical filter 10.

An optical measuring device employing the optical filter 10 according to the exemplary embodiments will now be described in detail with reference to FIG. 11.

The optical measuring device refers to a device capable of measuring intensity of incident light for each wavelength by analyzing a spectrum of the incident light. In a broad sense, the optical measuring device may include a system capable of analyzing a spectrum of light and informing an analysis result to a user via various types of displays. The optical measuring device may also transmit a measurement result to another device as simple data without displaying the measurement result.

Figure 11:
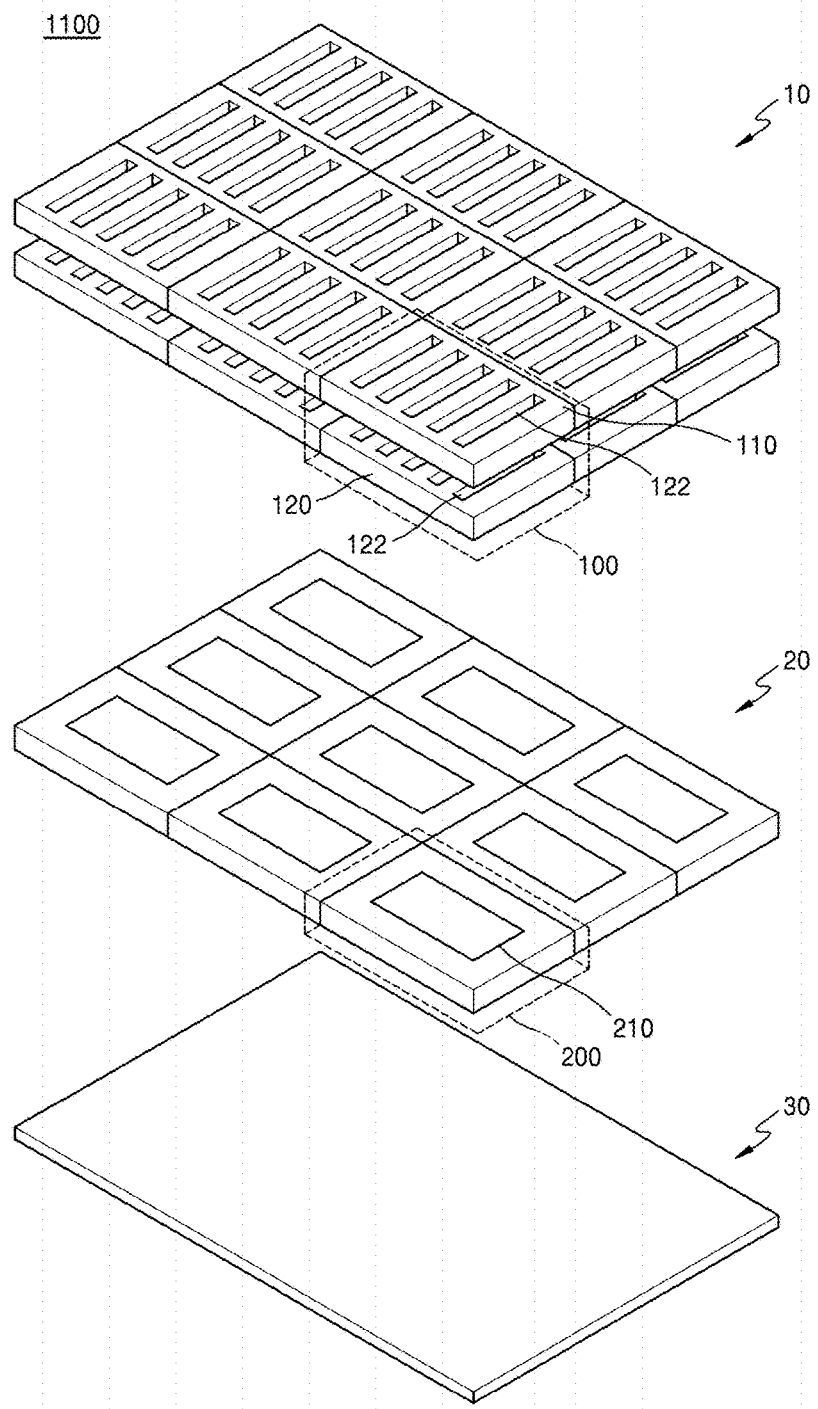
FIG. 11 is an exploded perspective view of an optical measuring device including an optical filter, according to another exemplary embodiment.

FIG. 11 is an exploded perspective view of an optical measuring device 1100 including an optical filter 10, according to another exemplary embodiment. As shown in FIG. 11, the optical measuring device includes an optical filter 10 for selectively transmitting a predetermined wavelength of incident light and a sensor 20 for measuring intensity of the light of the predetermined wavelength transmitted through the optical filter 10. The optical filter 10 may include a plurality of first pixels, including a first pixel 100, and the sensor 20 may include a plurality of second pixels, including a second pixel 200 corresponding to the first pixel 100. In this case, the optical filter 10 and the first pixel 100 may be the optical filter 10 and the first pixel 100 described above with reference to FIGS. 1 through 10.

As described above, the first pixel 100 receives incident light and includes a first reflective plate 110 having a plurality of first holes 112 formed therein and a second reflective plate 120 that opposes and is separated from the first reflective plate 110 by a predetermined distance and has a plurality of second holes 122 formed therein. Although a distance between the optical filter 10 and the sensor 20 looks relatively large, this is only for better visualization, and thus the distance may be smaller or larger than that if necessary.

All the optical filters 10 according to the exemplary embodiments described with reference to FIGS. 1 through 10 may be used as the optical filter 10 shown in FIG. 11. Thus, a wavelength of light being transmitted through the second reflective plate 120 may be determined by at least one selected from a thickness t of the first and second reflective plates 110 and 120, a refractive index of a material of the first and second reflective plates 110 and 120, a distance d between the first and second reflective plates 110 and 120, sizes of the first and second holes 112 and 122, a spacing P1 between adjacent ones of the first holes 112, and a spacing P2 between adjacent ones of the second holes 122.

Furthermore, the first and second holes 112 and 122 may be arranged in a regular pattern. The first holes 112 may have the same shape and arrangement pattern as the second holes 122. The first and second holes 112 and 122 may have a slit shape or circular shape.

Each of the first and second reflective plates 110 and 120 may contain a material having a refractive index greater than 3. For example, each of the first and second reflective plates 110 and 120 may include GaP, HgS, GaAs, Ge, Si, $SiO_2$, SiN, InP, or any combination thereof. The optical filter 10 may further include a lens 12 for changing a path of light incident on the first reflective plate 110.

Each of the plurality of second pixels, including the second pixel 200, receives light transmitted through a corresponding one of the first pixels 100 to measure intensity of the light. To do so, each of the plurality of second pixels may include an optical sensor 210 for measuring intensity of the light transmitted through the plurality of first pixels, including the first pixel 100. The optical sensor 210 may be a complementary metal-oxide-semiconductor (CMOS) image sensor (CIS) using a charge coupled device (CCD) or CMOS. Alternatively, the optical sensor 210 may be a photodiode sensor for converting light energy into electrical energy.

The optical measuring device 1100 may provide a user with information about intensity of light measured by the plurality of second pixels, including the second pixel 200. Before providing such information to the user, the optical measuring device 1100 may correct data measured by the plurality of second pixels. The optical measuring device 1100 may further include a correction processor 30 for performing correction of the measured data. The correction processor 30 may be a hardware device capable of performing general calculations. Transmittance of light through the plurality of first pixels, including the first pixel 100, may be considered when performing the correction. The need for the correction increases when the optical filter 10 includes the plurality of first pixels and transmittance of light through each of the plurality of first pixels 100 varies. Thus, the correction processor 30 in the optical measuring device 1100 may correct data measured by each of the plurality of second pixels according to transmittance of light through a corresponding one of the plurality of first pixels. To achieve this, the correction processor 30 may include a memory for storing transmittance of light through each of the plurality of first pixels.

In the optical filter 10 and the optical measuring device 1100 employing the optical filter 10 according to the exemplary embodiments, the plurality of first holes 112 and the plurality of second holes 122 are formed in the first and second reflective plates 110 and 120, respectively. Such construction may increase reflectance of the first and second reflective plates 110 and 120, thus decreasing a linewidth of light. Furthermore, by adjusting the shape and size of the first and second holes 112 and 122 and spacings between adjacent first or second holes 112 or 122, a wavelength of light being filtered may be easily changed.

In the optical measuring device 1100 employing the optical filter 10, each of the plurality of first pixels, including the first pixel 100, selectively transmits a particular wavelength of light. In turn, each of the plurality of second pixels, including the second pixel 200, measures intensity of the light transmitted from corresponding one of the plurality of first pixels. Thus, a separate space may not be required for performing spectroscopy in order to analyze a spectrum of light, and a space for filtering of light may also be utilized efficiently. The optical measuring device 1100 may be used in cameras, contaminant detection devices, biological analysis device, etc. As the size of the optical measuring device 1100 decreases, it may also be applied to healthcare-related devices. Thus, the optical measuring device 1100 may be used in portable or wearable devices to measure biological information of a human body in a non-invasive and periodical way.

According to the exemplary embodiments, a linewidth of light may be reduced by forming a plurality of first holes and a plurality of second holes in first and second reflective plates of an optical filter, respectively. Furthermore, it is possible to easily change a wavelength being filtered by adjusting the shape and size of the first and second holes and spacings between adjacent first or second holes.

In an optical measuring device employing an optical filter according to exemplary embodiments, each of pixels in the optical filter may selectively transmit only light of a particular wavelength, and each of pixels in a sensor may measure intensity of the transmitted light. Thus, the optical measuring device may not require a separate space for performing spectroscopy in order to analyze a spectrum of light and may efficiently utilize a space for filtering of light. The optical measuring device may be used in cameras, contaminant detection devices, biological analysis equipment, etc. As the size of the optical measuring device decreases, it may also be applied to healthcare-related devices. Thus, the optical measuring device 1100 may be used in portable or wearable devices to measure biological information of a human body in a non-invasive and periodical way.

While one or more exemplary embodiments have been described with reference to the figures, it should be understood that the exemplary embodiments described herein should be considered in a descriptive sense only and not for purposes of limitation. The scope of the inventive concept is defined not by the detailed description provided above but instead by the following claims.

What is claimed is:

1. An optical filter comprising:
a plurality of pixels arranged next to one another, each of the plurality of pixels comprising:
a first reflective plate that is configured to receive light and has first holes formed therein; and
a second reflective plate that faces the first reflective plate, is separated from the first reflective plate by a gap, and has second holes formed therein, the second holes corresponding to the first holes in shape and orientation, the second reflective plate being configured to transmit the light of a wavelength or the light of a range of wavelengths that has been transmitted through the first reflective plate and is incident on the second reflective plate,
wherein the light of the wavelength or the light of the range of wavelengths is transmitted according to a spacing between adjacent holes of the first holes or a spacing between adjacent holes of the second holes,
wherein at least one pixel, among the plurality of pixels, has the spacing between adjacent holes of the first holes different from that of at least one another pixel, among the plurality of pixels, or has the spacing between adjacent holes of the second holes different from that of the at least one another pixel, and
wherein the first reflective plate is included in a plurality of first reflective plates of the plurality of pixels, the plurality of first reflective plates being arranged along a first plane, and wherein the second reflective plate is included in a plurality of second reflective plates of the plurality of pixels, the plurality of second reflective plates being arranged along a second plane parallel to the first plane.

2. The optical filter of claim 1, wherein the wavelength or the range of wavelengths of the light transmitted through the second reflective plate corresponds to a thickness of the first reflective plate and the second reflective plate, respectively.

3. The optical filter of claim 1, wherein the wavelength or the range of wavelengths of the light transmitted through the second reflective plate corresponds to a refractive index of a material of the first reflective plate and the second reflective plate, respectively.

4. The optical filter of claim 1, wherein the wavelength or the range of wavelengths of the light transmitted through the second reflective plate corresponds to a distance between the first reflective plate and the second reflective plate.

5. The optical filter of claim 1, wherein the wavelength or the range of wavelengths of the light transmitted through the second reflective plate corresponds to sizes of the first and second holes.

6. The optical filter of claim 1, wherein the first holes and the second holes have a same arrangement pattern.

7. The optical filter of claim 6, wherein the first holes are vertically aligned to overlap with the second holes.

8. The optical filter of claim 1, wherein the first and second holes have a slit shape or a circular shape.

9. The optical filter of claim 1, wherein at least two of the plurality of pixels transmit light of different wavelengths.

10. The optical filter of claim 1, further comprising a lens configured to change a path of the light received by the first reflective plate.

11. The optical filter of claim 1, wherein each of the first reflective plate and the second reflective plate comprises a material having a refractive index greater than 3.

12. The optical filter of claim 1, wherein each of the first reflective plate and the second reflective plate comprises at least one selected from a group consisting of gallium phosphide (GaP), mercury sulfide (HgS), gallium arsenide (GaAs), germanium (Ge), silicon (Si), silicon dioxide ($SiO_2$), silicon nitride (SiN), indium phosphide (InP), and any combinations thereof.

13. An optical measuring device comprises:
an optical filter comprising a plurality of first pixels arranged next to one another, each of the plurality of first pixels comprising:
a first reflective plate configured to receive light and having first holes formed therein, and
a second reflective plate that faces the first reflective plate, is separated from the first reflective plate by a gap, and has second holes formed therein, the second reflective plate being configured to transmit the light of a wavelength or the light of a range of wavelengths that has been transmitted through the first reflective plate and is incident on the second reflective plate, the second holes corresponding to the first holes in shape and orientation; and
a sensor that is configured to measure an intensity of light transmitted through the optical filter and includes a plurality of second pixels, each of the plurality of second pixels corresponding to each of the plurality of first pixels in a one to one relationship and being configured to measure the intensity of light transmitted through a corresponding first pixel,
wherein the light of the wavelength or the light of the range of wavelengths is transmitted according to a spacing between adjacent holes of the first holes or a spacing between adjacent holes of the second holes,
wherein at least one first pixel, among the plurality of first pixels, has the spacing between adjacent holes of the first holes different from that of at least one another first pixel, among the plurality of first pixels, or has the spacing between adjacent holes of the second holes different from that of the at least one another first pixel,
wherein the first reflective plate is included in a plurality of first reflective plates of the plurality of first pixels, the plurality of first reflective plates being arranged along a first plane, and
wherein the second reflective plate is included in a plurality of second reflective plates of the plurality of first pixels, the plurality of second reflective plates being arranged along a second plane parallel to the first plane.

14. The optical measuring device of claim 13, wherein the wavelength or the range of wavelengths of the light transmitted through the second reflective plate corresponds to at least one selected from a thickness of the first reflective plate and the second reflective plate, respectively, a refractive index of a material of the first reflective plate and the second reflective plate, a distance between the first reflective plate and the second reflective plate, and sizes of the first and second holes.

15. The optical measuring device of claim 13, wherein the first holes and the second holes have a same arrangement pattern.

16. The optical measuring device of claim 13, wherein the first and second holes have a slit shape or a circular shape.

17. The optical measuring device of claim 16, wherein the optical filter further comprises a lens configured to change a path of the light received by the first reflective plate.

18. The optical measuring device of claim 16, wherein each of the first reflective plate and the second reflective plate comprises a material having a refractive index greater than 3.

19. The optical measuring device of claim 16, wherein each of the first reflective plate and the second reflective plate comprises at least one selected from a group consisting of gallium phosphide (GaP), mercury sulfide (HgS), gallium arsenide (GaAs), germanium (Ge), silicon (Si), silicon dioxide ($SiO_2$), silicon nitride (SiN), indium phosphide (InP), and any combinations thereof.

20. The optical measuring device of claim 16, wherein each of the plurality of second pixels comprises an optical sensor configured to measure the intensity of light transmitted through the corresponding first pixel.

21. The optical measuring device of claim 14, further comprising a correction processor configured to receive the intensity of light measured in at least one second pixel among the plurality of second pixels, and correct the intensity of light measured in the at least one second pixel in consideration of transmittance of light transmitted through the corresponding first pixel.

22. The optical filter of claim 1, wherein each of the first reflective plate and the second reflective plate is a rectangular plate which has a thickness less than a distance between the first reflective plate and the second reflective plate, the distance corresponding to the gap.

* * * * *